United States Patent
Tashiro

(10) Patent No.: US 11,327,274 B2
(45) Date of Patent: May 10, 2022

(54) OBSERVATION OPTICAL SYSTEM AND OBSERVATION APPARATUS INCLUDING THE SAME

(71) Applicant: CANON KABUSHIKI KAISHA, Tokyo (JP)

(72) Inventor: Yoshihisa Tashiro, Nikko (JP)

(73) Assignee: CANON KABUSHIKI KAISHA, Tokyo (JP)

(*) Notice: Subject to any disclaimer, the term of this patent is extended or adjusted under 35 U.S.C. 154(b) by 215 days.

(21) Appl. No.: 16/539,475

(22) Filed: Aug. 13, 2019

(65) Prior Publication Data
US 2020/0064592 A1 Feb. 27, 2020

(30) Foreign Application Priority Data

Aug. 22, 2018 (JP) .............................. JP2018-155318

(51) Int. Cl.
*G02B 9/00* (2006.01)
*G02B 9/10* (2006.01)
(Continued)

(52) U.S. Cl.
CPC .................. *G02B 9/10* (2013.01); *G02B 9/16* (2013.01); *G02B 13/18* (2013.01); *G02B 27/0025* (2013.01); *G02B 27/0075* (2013.01)

(58) Field of Classification Search
CPC ...... G02B 9/10; G02B 13/18; G02B 27/0025; G02B 27/0075; G02B 9/16;
(Continued)

(56) References Cited

U.S. PATENT DOCUMENTS 5,517,366 A 5/1996 Togino
5,734,505 A 3/1998 Togino et al.
(Continued)

FOREIGN PATENT DOCUMENTS

| CN | 205139462 U | 4/2016 |
| CN | 107807449 A | 3/2018 |
| JP | H07120679 A | 5/1995 |

OTHER PUBLICATIONS

Notification of the First Office Action issued by the China National Intellectual Property Administration dated Oct. 9, 2021 in corresponding CN Patent Application No. 201910766542.2, with English translation.

*Primary Examiner* — Thomas K Pham
*Assistant Examiner* — Henry A Duong
(74) *Attorney, Agent, or Firm* — Carter, DeLuca & Farrell LLP

(57) ABSTRACT

An observation optical system for use in observing an image displayed on an image displaying surface, includes, in order from an observation surface side to the image displaying surface side: a first lens having a first transmission reflective surface and a first transmissive surface; and a second lens having a second transmission reflective surface and a second transmissive surface, in which the first lens and the second lens are arranged via an interval interposed therebetween; light from the image displaying surface transmits through the second lens, is reflected by the first transmission reflective surface, is reflected by the second transmission reflective surface, is transmitted through the first lens, and then travels toward the observation surface side; and a focal length of the first lens and a focal length of the observation optical system are appropriately set.

19 Claims, 12 Drawing Sheets

(51) Int. Cl.
  *G02B 13/18* (2006.01)
  *G02B 27/00* (2006.01)
  *G02B 9/16* (2006.01)

(58) Field of Classification Search
  CPC .............. G02B 13/0035; G02B 13/003; G02B 17/0856; G02B 25/001; G02B 27/0172; G02B 3/00; G02B 3/02; G02B 3/04; G02B 3/06; G02B 3/08; G02B 9/00; G02B 9/02; G02B 9/04; G02B 9/06; G02B 9/08; G02B 9/12; G02B 9/14; G02B 9/18; G02B 9/20; G02B 9/22; G02B 9/24; G02B 9/26; G02B 9/28; G02B 9/30; G02B 9/32; G02B 9/34; G02B 9/36; G02B 9/38; G02B 9/40; G02B 9/42; G02B 9/44; G02B 9/46; G02B 9/48; G02B 9/50; G02B 9/52; G02B 9/54; G02B 9/56; G02B 9/58; G02B 9/60; G02B 9/62; G02B 9/64; G02B 13/00; G02B 13/002; G02B 13/004; G02B 13/0045; G03B 30/00
  USPC ........................................................ 359/716
  See application file for complete search history.

(56) References Cited

U.S. PATENT DOCUMENTS

| | | |
|---|---|---|
| 6,480,338 B1 | 11/2002 | Ohzawa |
| 8,854,504 B2 | 10/2014 | Tashiro |
| 9,555,589 B1 * | 1/2017 | Ambur ................ G02B 27/286 |
| 10,126,523 B2 | 11/2018 | Tashiro |
| 10,606,095 B2 * | 3/2020 | Takagi ................... G02B 27/28 |
| 2013/0342749 A1 | 12/2013 | Tashiro |

* cited by examiner

OBSERVATION OPTICAL SYSTEM AND OBSERVATION APPARATUS INCLUDING THE SAME

BACKGROUND OF THE INVENTION

Field of the Invention

The present invention relates to an observation optical system. The present invention relates to an observation optical system suitable for a head mounted display, for example, for use in enlarging and displaying an original image displayed on an image displaying element, for example, a liquid crystal display (LCD), for observation.

Description of the Related Art

In recent years, there have been known a head mounted display and other such image displaying apparatus (observation apparatus) for use in enlarging and displaying, via an observation optical system, an original image displayed with the use of an image displaying element, for example, an LCD, and presenting a large-screen image to a user, to thereby provide a realistic experience.

Here, it is required for the image displaying apparatus to have a small structure in consideration of mounting on a head. In other words, it is required for an observation optical system for use in the image displaying apparatus to have a small size as an entire system while having a wide field of view and high optical performance.

In the related art, there is known a concentric optical system, which has a wide field of view and high optical performance, and uses a reflective surface as an observation optical system having a small-sized structure (U.S. Pat. No. 5,517,366).

In U.S. Pat. No. 5,517,366, the concentric optical system using two semi-transmissive surfaces is disclosed. With the concentric optical system being formed of the two semi-transmissive spherical surfaces, astigmatism and comatic aberration are corrected by rotational symmetry, and curvature of field is corrected with the use of two reflective surfaces.

In each Embodiment disclosed in U.S. Pat. No. 5,517,366, with a configuration based on the concentric optical system, there is adopted a configuration in which a refractive power (reciprocal of a focal length) of the entire optical system is shared mainly by the two reflective surfaces. Moreover, in each Embodiment, the only reflective surface having a positive refractive power is the semi-transmissive surface arranged on an image surface side (image displaying surface side), and the reflective surface has a strong refractive power. At this time, a curvature of the semi-transmissive surface having the positive refractive power is increased, and it has been difficult to reduce a thickness of the optical system (here, a distance between a lens outer diameter end and the image surface or image displaying surface is defined as the "thickness"). In Embodiments 8 and 9 of U.S. Pat. No. 5,517,366, there is disclosed a configuration in which a positive lens is arranged on an observation surface (pupil surface), but its share of refractive power is small, and also in the configuration, the refractive power is mainly shared by the semi-transmissive surface having the positive refractive power.

In other words, with an observation optical system based on a concentric optical system, it is a big problem to reduce a thickness of the optical system.

SUMMARY OF THE INVENTION

It is an object of the present invention to provide an observation optical system that is easily formed to have a small thickness as the entire system while having a wide field of view and high optical performance.

According to at least one embodiment of the present invention, there is provided an observation optical system for use in observing an image displayed on an image displaying surface, the observation optical system including, in order from an observation surface side to the image displaying surface side: a first lens having a first transmission reflective surface and a first transmissive surface; and a second lens having a second transmission reflective surface and a second transmissive surface, the first lens and the second lens being arranged via an interval interposed therebetween, light from the image displaying surface being transmitted through the second lens, being reflected by the first transmission reflective surface, being reflected by the second transmission reflective surface, being transmitted through the first lens, and then traveling toward the observation surface side, wherein the following conditional expression is satisfied:

$$2.0 < fG1/f < 10.0,$$

where fG1 is a focal length of the first lens, and f is a focal length of the observation optical system.

Further features of the present invention will become apparent from the following description of exemplary embodiments with reference to the attached drawings.

DESCRIPTION OF THE EMBODIMENTS

Now, at least one exemplary embodiment of the present invention is described with reference to the attached drawings.

An observation optical system according to at least one embodiment of the present invention is an observation optical system for use in observing an image displayed on an image displaying surface. The observation optical system includes, in order from an observation surface side to the image displaying surface side: a first lens having a positive refractive power and having a first transmission reflective surface, which consists of a semi-transmission reflective surface, and a first transmissive surface that is transmissive on the image displaying surface side; and a second lens having a second transmission reflective surface that is semi-transmission reflective on the observation surface side, and a second transmissive surface that is transmissive on the image displaying surface side. The first lens and the second lens are arranged via an air interval.

A light flux from the image displaying surface is sequentially transmitted through the second lens, enters the first lens, is reflected on the first transmission reflective surface toward the image displaying surface side, is then transmitted through the first lens, is reflected on the second transmission reflective surface of the second lens toward the observation surface side, is transmitted through the first lens, and then enters the observation surface.

Figure 11:
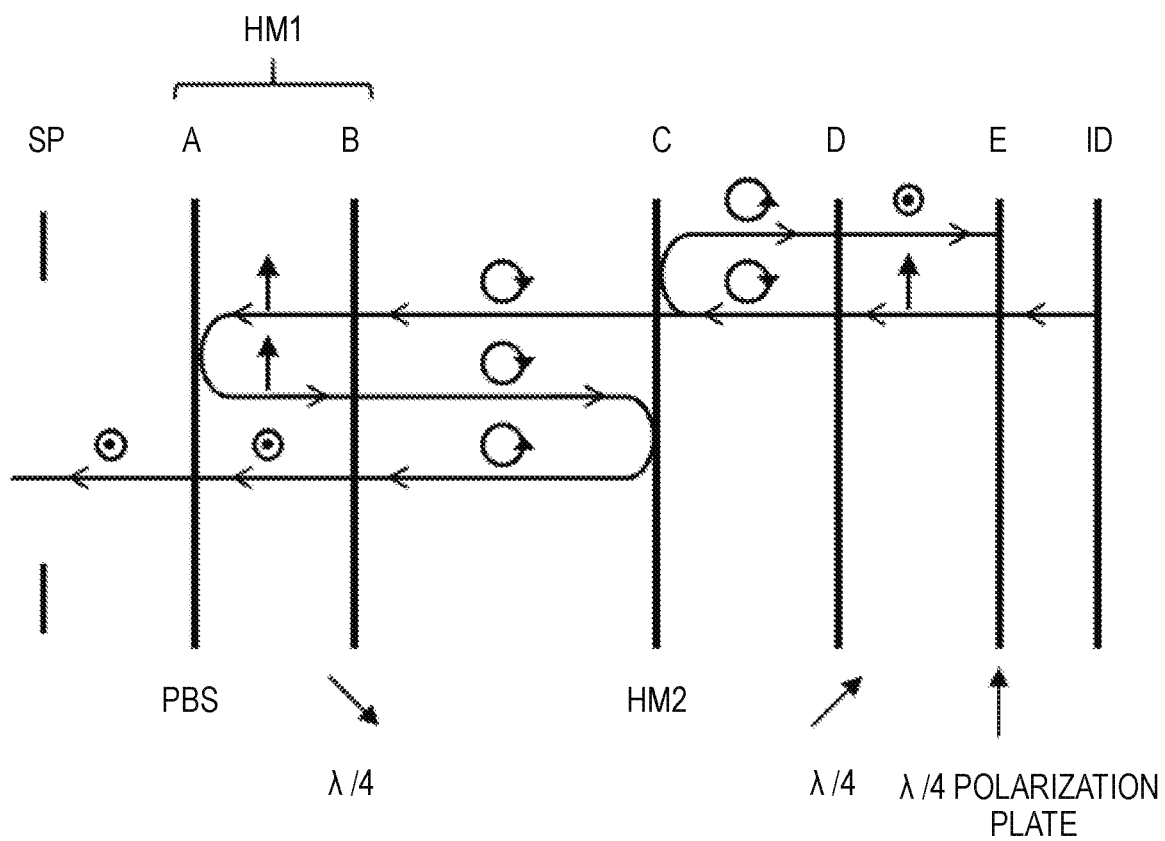
FIG. 11 is an explanatory diagram of an optical path of an observation optical system using polarization.
Figure 12A:
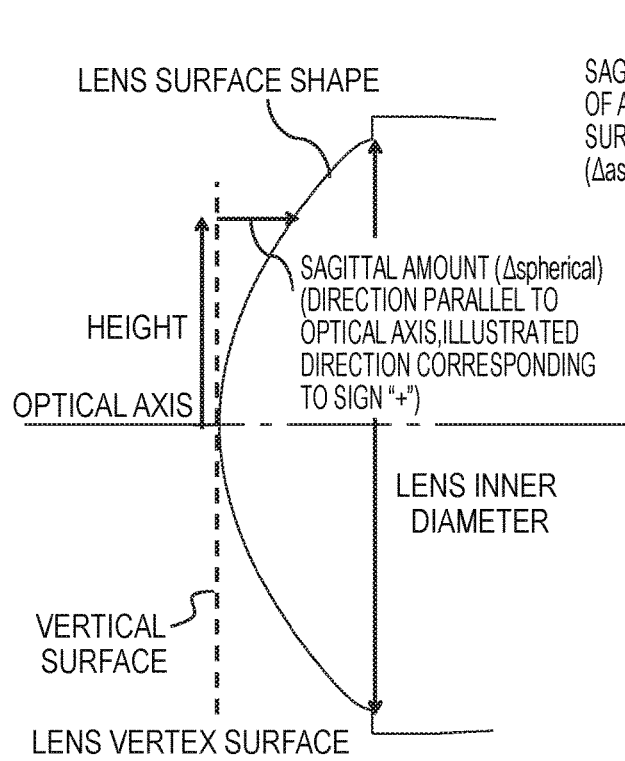
FIG. 12A is an explanatory diagram of an aspherical surface shape.
Figure 12B:
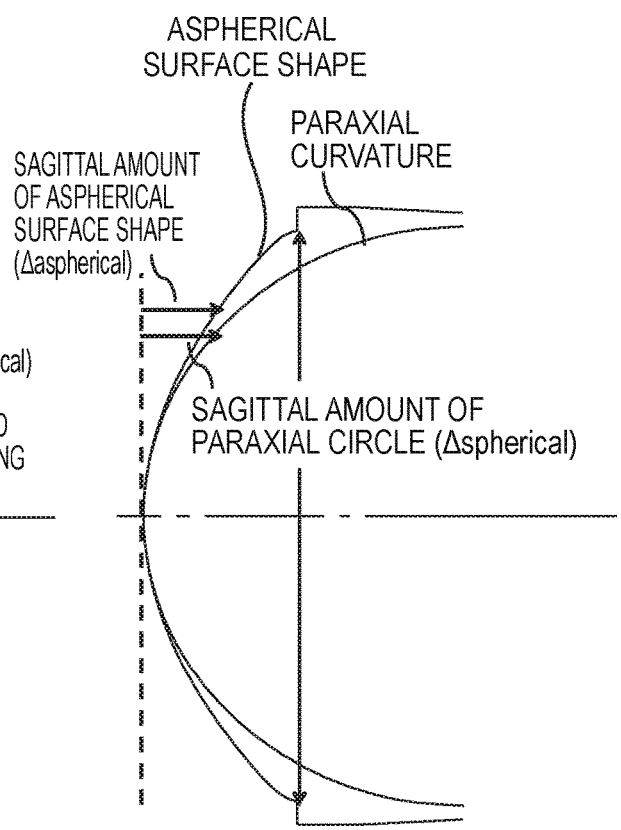
FIG. 12B is an explanatory diagram of the aspherical surface shape.

FIG. 1, FIG. 3, FIG. 5, FIG. 7, and FIG. 9 are lens cross-sectional views of Embodiments 1 to 5 of the present invention. Moreover, FIG. 2, FIG. 4, FIG. 6, and FIG. 8 are longitudinal aberration diagrams (pupil diameter Φ: 3.5 mm, eye relief: 18 mm) of Embodiments 1 to 5 of the present invention. Further, FIG. 11 is an explanatory diagram of a configuration in which polarization is used in the observation optical system according to at least one embodiment. FIG. 12A and FIG. 12B are explanatory diagrams of an aspherical surface shape.

In the lens cross-sectional views, a stop (observation surface, pupil surface) is denoted by SP. An image displaying surface is denoted by ID. A first lens is denoted by G1, and a second lens is denoted by G2. A first transmission reflective surface is denoted by HM1, and a second transmission reflective surface is denoted by HM2. A polarization plate is denoted by E.

The observation optical system of each of Embodiments includes, in order from the observation surface SP side to the image displaying surface ID side: the first lens G1 having a positive refractive power and having the first transmission reflective surface HM1 that is semi-transmission reflective on the observation surface SP side, the air interval; and the second lens G2 having the second transmission reflective surface HM2 that is semi-transmission reflective on the observation surface SP side. As the image displaying surface ID, an image displaying surface of an LCD is arranged, for example. In this embodiment, as the observation surface SP, a pupil of an observer is positioned. As the observation surface SP, a light amount aperture may be arranged in some cases.

In the lens cross-sectional view in each of Embodiments, an eye relief represents an interval between an eye point (pupil position) and a lens surface R1 closest to the observation surface SP side on an optical axis. In evaluation of aberration, aberration of a ray reaching the observation surface SP side with a light emitting point provided on the image displaying surface ID side and aberration of a ray reaching the image displaying surface ID side with a light emitting point provided on the observation surface SP side correspond one-to-one, and hence aberration on the image displaying surface ID is evaluated for convenience.

In a spherical aberration diagram of the aberration diagrams, the solid line "d" indicates a d-line (wavelength: 587.6 nm), and the dotted line "g" indicates a g-line (wavelength: 435.8 nm). In an astigmatism diagram, ΔS (solid line) indicates a sagittal image plane of the d-line, and ΔM (broken line) indicates a meridional image plane of the d-line. Distortion is shown with respect to the d-line. Chromatic aberration of magnification is shown with respect to the g-line.

A pupil diameter is represented by EPD. An angle of view (half angle of view) is represented by "ω". A numerical value is a value expressing Numerical Data to be described later in units of mm.

Here, a pupil diameter of a person is Φ (diameter) of about 3.5 mm as an example, and hence longitudinal aberrations are shown with the pupil diameter (EPD) Φ of 3.5 mm and with the eye relief being representatively at a position of 18 mm.

Now, a configuration of each of Embodiments is described.

The observation optical system according to each of Embodiments includes, in order from the observation surface SP side: the first lens G1 having the positive refractive power and having the first transmission reflective surface HM1 on the observation surface SP side; the air interval; and the second lens G2 having the second transmission reflective surface HM2 on the observation surface SP side.

In this embodiment, a first transmissive surface of the first lens G1 is arranged between the first transmission reflective surface HM1 and the second transmission reflective surface HM2. As a result, there is provided a so-called "triple-pass configuration", in which the light flux from the image displaying surface ID passes through the first lens G1 three times. According to this configuration, it is possible to increase a positive refractive power sharing the positive refractive power of the first lens G1 without increasing a thickness (lens thickness) of the first lens G1. At this time, a refractive power share of the second transmission reflective surface HM2 having a positive refractive power can be reduced, with the result that a curvature of a lens surface of the second transmission reflective surface HM2 can be reduced, and hence that a thickness of the observation optical system can be reduced. Moreover, with the air interval being arranged between the first lens G1 and the second lens G2, flexibility of shapes of the lens surfaces is secured, and spherical aberration, which tends to be increased when a refractive power share of the first lens G1 is increased in the triple-pass configuration, is satisfactorily corrected. Further, the second transmission reflective surface HM2 is arranged on the observation surface SP side of the second lens G2 to provide a so-called "single-pass configuration", in which the light flux passes through the second lens G2 once. The observation optical system according to each of Embodiments uses polarization as described below to increase efficiency of use of light. Here, when polarization is used, a polarization state may be varied from an ideal state of design due to birefringence of an optical material. This problem occurs especially when a resin material is used as the optical material in order to reduce a weight of the optical system. In other words, it is preferred to adopt a configuration in which an optical path length in the optical material is reduced in the entire optical system. In each of Embodiments, only the first lens G1, which contributes to the reduction in thickness of the observation optical system, is used in the triple-pass configuration as described above to achieve an arrangement in which the optical path length in the optical material is minimized.

With the above-mentioned configuration, an observation optical system that is easily reduced in thickness while having a wide field of view and high optical performance is achieved.

Based on each of Embodiments, a more preferred configuration is described.

In the observation optical system according to at least one embodiment, it is more preferred to satisfy at least one of conditional expressions provided below.

A curvature radius (paraxial curvature radius in the case of an aspherical surface) of the second transmission reflective surface is represented by RHM2, and a focal length of the observation optical system is represented by "f". A focal length of the first lens G1 is represented by fG1. A curvature radius (paraxial curvature radius in the case of an aspherical surface) of the surface on the observation surface side of the first lens G1 is represented by RG1a, and a curvature radius (paraxial curvature radius in the case of an aspherical surface) of the surface on the image displaying surface side of the first lens G1 is represented by RG1b. A center thickness (thickness on the optical axis) of the first lens G1 is represented by DG1, and a center thickness of the second lens G2 is represented by DG2.

The surface on the image displaying surface ID side of the first lens G1 is an aspherical surface, and a difference between a sag amount of a paraxial curvature surface (reference spherical surface) and a sag amount of the aspherical surface at a maximum effective diameter end of the aspherical surface is represented by sagG1b with a sag amount from the observation surface SP side to the image displaying surface ID side being positive.

In an observation apparatus including the observation optical system according to each of Embodiments and an image displaying element configured to display image information, the observation apparatus being configured to be used to observe the image information on the image displaying element, which has been enlarged by the observation optical system, via the observation optical system, a distance from the first transmission reflective surface to the image displaying surface is represented by OAL. It should be noted, however, that the "distance" as used herein refers to an air-equivalent length, and the existence of an optical member that does not contribute to image formation, for example, a glass block, is neglected.

Here, the difference sagG1b between the sag amount of the paraxial curvature surface and the sag amount of the aspherical surface is as follows. A paraxial curvature surface in the aspherical surface is defined as an amount (reference R) determined by ten percent of a height from the optical axis with respect to a diameter of a maximum optical effective surface. An aspherical amount of an aspherical surface in each of Embodiments is described with reference to FIG. 12A and FIG. 12B. FIG. 12A and FIG. 12B are explanatory diagrams of a sag amount of a lens surface having a spherical shape and a sag amount of a lens surface having an aspherical surface shape. A "sag amount" refers to a distance in an optical axis direction from a vertical surface erecting from a vertex of a lens surface with respect to the optical axis to a position of the lens surface at a height "h" from the optical axis.

In FIG. 12A and FIG. 12B, when a curvature of the lens surface has a sign "+", the sag amount is "positive". When a sag amount of the reference spherical surface and a sag amount of the aspherical surface at a paraxial curvature at a height "h" from the optical axis are represented by $\Delta$spherical and $\Delta$aspherical, respectively, a difference $\Delta$ between the sag amounts is expressed by the following expression.

$$\Delta = \Delta\text{spherical} - \Delta\text{aspherical}$$

In FIG. 12B, the difference $\Delta$ between the sag amounts has the sign "+".

At this time, it is preferred to satisfy at least one of the following conditional expressions.

$$-5.0 < RHM2/f < -1.0 \quad (1)$$

$$2.0 < fG1/f < 10.0 \quad (2)$$

$$0.1 < (RG1a + RG1b)/(RG1a - RG1b) < 5.0 \quad (3)$$

$$0.1 < DG1/DG2 < 3.0 \quad (4)$$

$$0.001 < \text{sag}G1b/f < 0.200 \quad (5)$$

$$0.1 < DG1/OAL < 0.5 \quad (6)$$

$$0.4 < OAL/f < 2.0 \quad (7)$$

Next, technical meanings of the conditional expressions are described.

In the conditional expression (1), a ratio of the curvature radius RHM2 of the second transmission reflective surface that is semi-transmission reflective to the focal length of the observation optical system is defined. When the conditional expression (1) is satisfied, there is achieved an arrangement in which the curvature of the second transmission reflective surface HM2 is reduced to reduce the thickness of the observation optical system.

When the ratio of the conditional expression (1) falls below the lower limit of the conditional expression (1), the curvature radius RHM2 of the second transmission reflective surface becomes much larger. At this time, the positive refractive power when using a reflective surface becomes much lower, with the result that the observation optical system is disadvantageously increased in size, or it becomes difficult to secure a wide viewing angle. In contrast, when the ratio of the conditional expression (1) exceeds the upper limit thereof, the curvature radius RHM2 of the second transmission reflective surface becomes much smaller, and it becomes difficult to reduce the thickness of the observation optical system.

In the conditional expression (2), a ratio of the focal length of the first lens G1 having the positive refractive power to the focal length of the observation optical system is defined. When the conditional expression (2) is satisfied, the first lens G1's share of the refractive power is optimized to reduce the thickness of the observation optical system.

When the ratio of the conditional expression (2) falls below the lower limit of the conditional expression (2), the focal length of the first lens G1 becomes much shorter with respect to the focal length of the observation optical system, and it becomes difficult to correct spherical aberration. In contrast, when the ratio of the conditional expression (2) exceeds the upper limit thereof, the focal length of the first lens G1 becomes much longer with respect to the focal length of the observation optical system. At this time, the second transmission reflective surface HM2's share of the refractive power is increased too much, with the result that the thickness of the observation optical system is disadvantageously increased.

In the conditional expression (3), lens shape factors of the first lens G1 are defined. When the conditional expression (3) is satisfied, there is achieved a configuration in which the center thickness is not increased too much while an appropriate refractive power is placed on the first lens G1.

When the ratio of the conditional expression (3) falls below the lower limit of the conditional expression (3), a lens shape of the first lens G1 becomes a strongly biconvex shape, and the center thickness is disadvantageously increased in order to secure an edge thickness. In contrast, when the ratio of the conditional expression (3) exceeds the upper limit thereof, the lens shape of the first lens G1 becomes a meniscus shape that is concave toward the observation surface SP side, and it becomes difficult to secure a desired refractive power. At this time, the second transmission reflective surface HM2's share of the refractive power is increased too much, and hence the thickness of the observation optical system is disadvantageously increased.

In the conditional expression (4), a ratio of the center thickness of the first lens G1 to the center thickness of the second lens G2 is defined. When the conditional expression (4) is satisfied, the center thickness of the first lens G1 and the center thickness of the second lens G2 are optimized, and increased performance of the observation optical system is achieved. In other words, when there is adopted an arrangement in which the thickness of the first lens G1, which is used in the triple-pass configuration, is limited with respect to the center thickness of the second lens G2, which is used in the single-pass configuration, there is provided a configuration in which the optical path length in the optical material is not increased more than required.

When the ratio of the conditional expression (4) falls below the lower limit of the conditional expression (4), the center thickness of the first lens G1 becomes much smaller with respect to the center thickness of the second lens G2. At this time, this is advantageous in terms of reducing the optical path length in the optical material in the observation optical system, but it becomes difficult to secure an edge thickness of a predetermined length while placing a desired refractive power on the first lens G1. In other words, the second transmission reflective surface HM2's share of the refractive power is increased too much, with the result that the thickness of the observation optical system is disadvantageously increased.

In contrast, when the ratio of the conditional expression (4) exceeds the upper limit thereof, the center thickness of the first lens G1 becomes much larger with respect to the center thickness of the second lens G2. In other words, the center thickness of the first lens G1 used in the triple-pass configuration is increased, with the result that the optical path length in the optical material in the observation optical system is significantly increased. At this time, when a configuration using polarization is adopted as described later, the polarization state is disadvantageously varied from the ideal state of design due to the birefringence of the optical material.

In the conditional expression (5), an aspherical surface shape of the surface on the image displaying surface ID side of the first lens G1 having the positive refractive power is defined as a sag amount. The aspherical sag amount of the surface on the image displaying surface ID side of the first lens G1 is optimized to satisfactorily correct spherical aberration in particular. As described above, with the first lens G1 being used in the triple-pass configuration, the arrangement of the first lens G1 as the aspherical surface is an advantageous configuration in terms of correcting aberration of the observation optical system, and it becomes easier to achieve higher performance of the observation optical system. Moreover, when the conditional expression (5) is satisfied, there is obtained a configuration that is advantageous in securing a predetermined amount of lens edge thickness of the first lens G1, and it becomes easier to reduce the center thickness of the first lens G1.

When the ratio of the conditional expression (5) falls below the lower limit of the conditional expression (5), the aspherical sag amount of the surface on the image displaying surface ID side of the first lens G1 becomes much smaller to form a substantially spherical shape, with the result that it becomes difficult to correct spherical aberration, and that the center thickness of the lens for securing the lens edge thickness is disadvantageously increased. In contrast, when the ratio of the conditional expression (5) exceeds the upper limit thereof, the aspherical sag amount of the surface on the image displaying surface ID side of the first lens G1 becomes much larger. At this time, spherical aberration is disadvantageously overcorrected.

In the conditional expression (6), a ratio of the center thickness of the first lens G1 to a total lens length (distance from a vertex of a surface on the optical axis of the first transmission reflective surface to the image displaying surface ID of the observation optical system excluding the pupil surface, in which the glass block is an air-equivalent length) of the observation optical system is defined. When the conditional expression (6) is satisfied, the center thickness of the first lens G1 is optimized to reduce the thickness of the optical system and obtain high optical performance.

When the ratio of the conditional expression (6) falls below the lower limit of the conditional expression (6), the center thickness of the first lens G1 becomes much smaller. At this time, it becomes difficult to secure a sufficient edge thickness while placing a desired refractive power on the first lens G1, and the second transmission reflective surface HM2's share of the refractive power is increased too much, with the result that the thickness of the observation optical system is disadvantageously increased. In contrast, when the ratio of the conditional expression (6) exceeds the upper limit thereof, the center thickness of the first lens G1 becomes much larger. Here, the first lens G1 is used in the triple-pass configuration, and hence the optical path length in the optical material of the first lens G1 is increased too much. At this time, when a configuration using polarization is adopted as described later, the polarization state is disadvantageously varied from the ideal state of design due to the birefringence of the optical material.

In the conditional expression (7), a ratio of the total lens length to the focal length of the observation optical system is defined. When the conditional expression (7) is satisfied, downsizing of the observation optical system is achieved.

When the ratio of the conditional expression (7) falls below the lower limit of the conditional expression (7), the total lens length becomes much shorter with respect to the focal length of the observation optical system. At this time, it becomes difficult to correct spherical aberration and curvature of field. In contrast, when the ratio of the conditional expression (7) exceeds the upper limit thereof, the total lens length is disadvantageously increased.

It is more preferred to set the numerical value ranges of the conditional expressions (1) to (7) as follows.

$$-4.0 < RHM2/f < -1.5 \tag{1a}$$

$$3.0 < fG1/f < 9.0 \tag{2a}$$

$$0.5 < (RG1a + RG1b)/(RG1a - RG1b) < 3.5 \tag{3a}$$

$$0.3 < DG1/DG2 < 2.0 \tag{4a}$$

$$0.01 < sagG1b/f < 0.1 \tag{5a}$$

$$0.15 < DG1/OAL < 0.4 \tag{6a}$$

$$0.6 < OAL/f < 1.5 \tag{7a}$$

It is still more preferred to set the numerical value ranges of the conditional expressions (1a) to (7a) as follows.

$$-3.5 < RHM2/f < -2.0 \tag{1b}$$

$$4.0 < fG1/f < 8.0 \tag{2b}$$

$$1.0 \leq (RG1a + RG1b)/(RG1a - RG1b) < 2.5 \tag{3b}$$

$$0.5 < DG1/DG2 < 1.8 \tag{4b}$$

$$0.02 < sagG1b/f < 0.06 \tag{5b}$$

$$0.2 < DG1/OAL < 0.3 \tag{6b}$$

$$0.8 < OAL/f < 1.0 \tag{7b}$$

Moreover, in Embodiments 1 to 4 of Embodiments, the first transmission reflective surface HM1 is arranged as a flat surface.

As described later, it is preferred to use a semi-transmission reflecting element having a polarization-selective characteristic as the first transmission reflective surface HM1. As the semi-transmission reflecting element semi-transmission reflecting element, there is known a product name "WGF" manufactured by Asahi Kasei Corporation, for example. Such a film-like polarization element is also applicable to a curved surface, but when the polarization element is arranged as the flat surface, a shift in axial orientation, a change in surface shape, a defect in appearance, and other risks due to a stress generated when the film is bent can be reduced.

Moreover, when the following configuration is adopted in each of Embodiments 1 to 5, ghost light (leak of undesirable light) from the optical path, which is transmitted without being reflected by a semi-transmissive surface even once, can be reduced while a reduction in amount of light in a normal observation optical path is suppressed.

As to the optical path of the observation optical system in each of Embodiments, the configuration using polarization is described with reference to FIG. 1 and FIG. 11.

Figure 1:
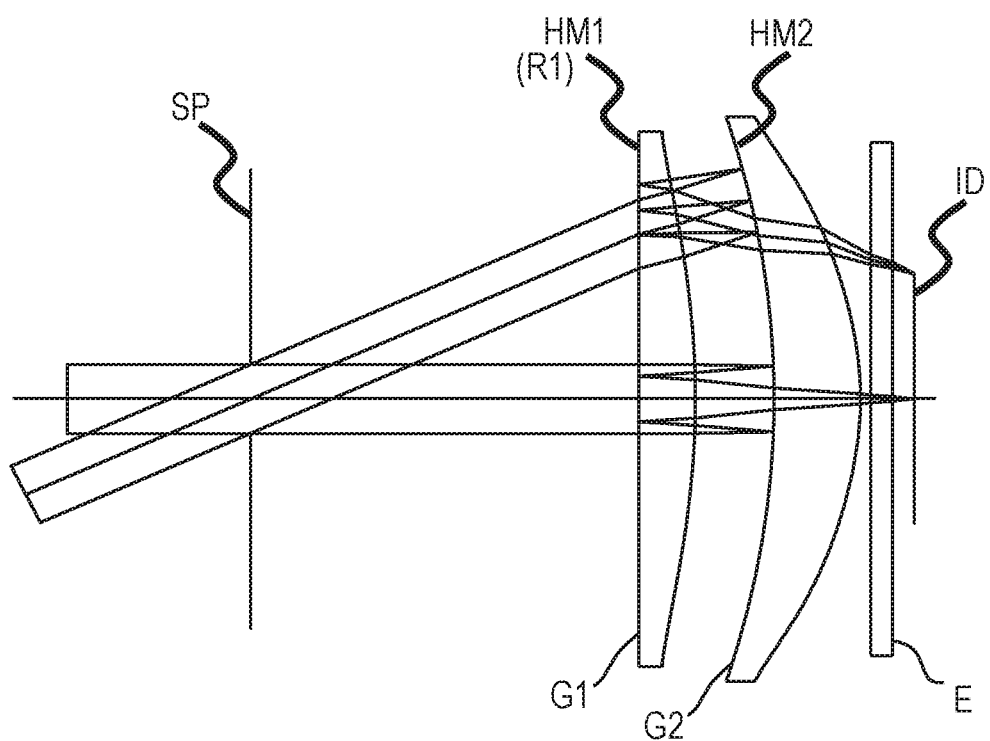
FIG. 1 is a lens cross-sectional view of Embodiment 1 of the present invention.
Figure 2:
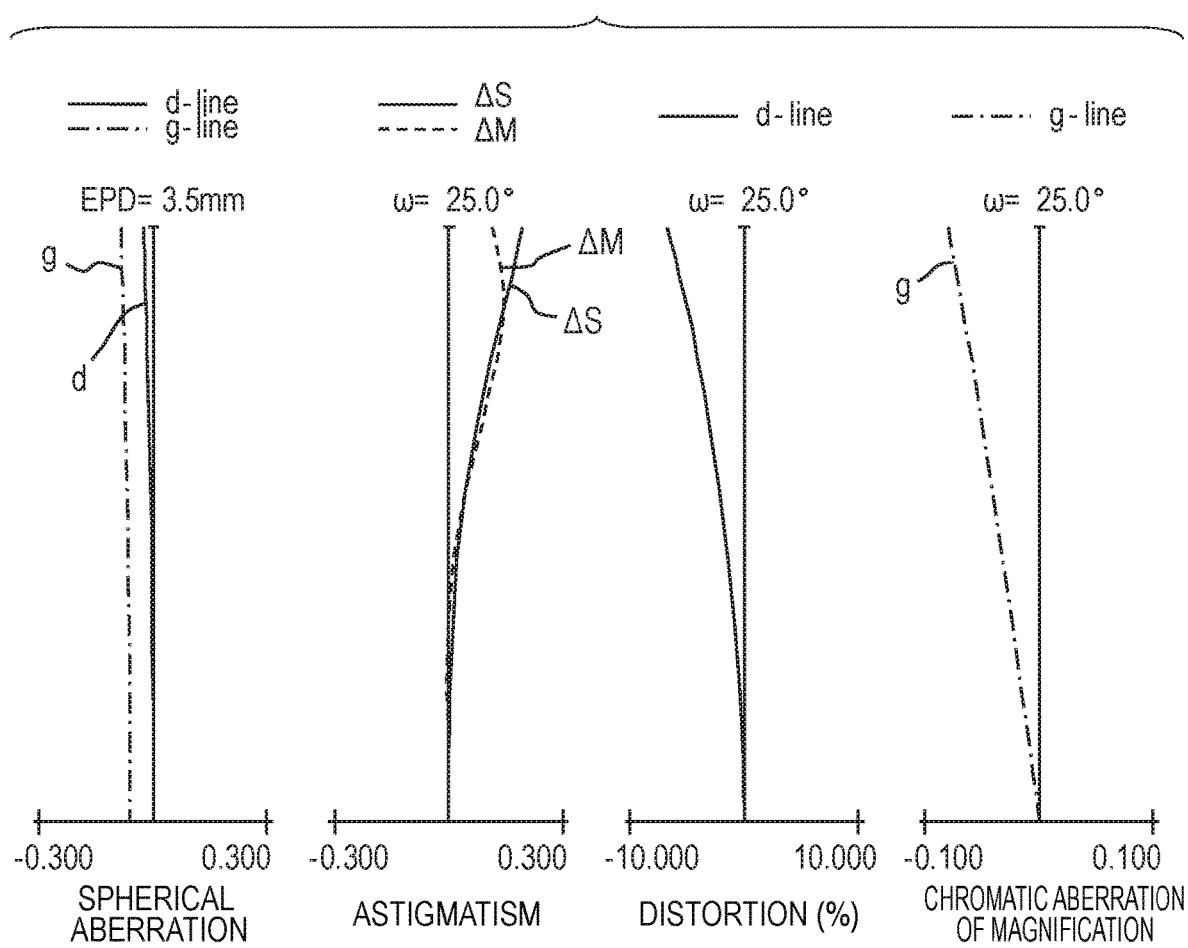
FIG. 2 is a longitudinal aberration diagram (pupil diameter Φ: 3.5 mm, eye relief: 18 mm) of Embodiment 1.

As to the first transmission reflective surface HM1 of FIG. 1, a semi-transmission reflecting element having a polarization-selective characteristic: A and a first λ/4 wavelength plate: B are arranged in order from the observation surface SP side to the image displaying surface ID side to form the first transmission reflective surface HM1 that is semi-transmission reflective. Moreover, as to the second transmission reflective surface HM2 of FIG. 1, a half mirror: C is arranged to form the second transmission reflective surface HM2 that is semi-transmission reflective. Further, as a parallel plate arranged on the image displaying surface ID side, a second λ/4 wavelength plate: D and a polarization plate: E are arranged.

Here, the semi-transmission reflecting element A is a wire grid polarizer configured to reflect light having linear polarization that is polarized in the same direction as that of light that has passed through the polarization plate E, and transmit light having linear polarization that is orthogonal to the light, for example. At this time, a surface on which the wire grid is formed of the semi-transmission reflecting element A serves as a semi-transmission reflective surface. Moreover, the first λ/4 wavelength plate B and the second λ/4 wavelength plate D are arranged under a state in which slow axes thereof are inclined by 90°, and under a state in which the slow axis of the first λ/4 wavelength plate B is inclined by 45° with respect to a polarization transmissive axis of the polarization plate E. Further, the half mirror C is a half mirror formed of a dielectric multilayer film, and serves as a semi-transmission reflective surface, for example.

Next, selection of the optical path, and an action of the configuration using the polarization are described with reference to FIG. 11.

The light that is output from the image displaying surface ID is changed to linear polarization by the polarization plate E, is changed to circular polarization by the second λ/4 wavelength plate D, and enters the half mirror C. A part of the light that has reached the half mirror C is reflected to have reverse circular polarization, and returns to the second λ/4 wavelength plate D. The light having the reverse circular polarization that has returned to the second λ/4 wavelength plate D returns to the polarization plate E as light having linear polarization that is polarized in a direction orthogonal to that at the time when having passed through the polarization plate E for the first time by the second λ/4 wavelength plate D, and is absorbed by the polarization plate E.

In contrast, another part of the light that has reached the half mirror C is transmitted therethrough to have linear polarization that is polarized in the same direction as that of the light that has passed through the polarization plate E by the first λ/4 wavelength plate B, and enters the semi-transmission reflecting element A. Here, the light having linear polarization that is polarized in the same direction as that of the light that has passed through the polarization plate E is reflected by polarization selectivity of the semi-transmission reflecting element A. The light that has been reflected by the semi-transmission reflecting element A is changed to circular polarization that is reverse to the circular polarization that is first obtained by the second λ/4 wavelength plate D by the first λ/4 wavelength plate B, and enters the half mirror C.

The light that has been reflected by the half mirror C is changed to circular polarization that is reverse to that of the light before the reflection, enters the first λ/4 wavelength plate B to have linear polarization that is polarized in a direction orthogonal to that at the time when having passed through the polarization plate E for the first time, and enters the semi-transmission reflecting element A. Here, the light having the linear polarization that is polarized in the direction orthogonal to that at the time when having passed through the polarization plate E is transmitted by the polarization selectivity of the semi-transmission reflecting element A to be guided to an exit pupil SP.

With the above-mentioned action, only the light that has been transmitted through the second transmission reflective surface HM2, reflected by the first transmission reflective surface HM1, reflected by the second transmission reflective surface HM2, and transmitted through the first transmission reflective surface HM1 is guided to the pupil SP.

In FIG. 1, there is illustrated an example in which the functional elements A and B are integrally formed on the surface on the pupil surface side of the first lens G1, but the functional elements A and B may be arranged as separate members having a planar shape at positions independent of the lens surface, for example.

Embodiment 1

Now referring to FIG. 1, the observation optical system according to Embodiment 1 of the present invention is described.

Embodiment 1 relates to an observation optical system having a total angle of view (total observation angle of view) of 50°.

In Embodiment 1, the observation optical system includes, in order from the observation surface SP side, the first lens G1 having the positive refractive power and having a plano-convex shape, in which the first transmission reflective surface HM1 that is semi-transmission reflective is arranged on the observation surface SP side. The observation optical system further includes the second lens G2 having the positive refractive power and having a meniscus shape that is concave toward the observation surface SP side, in which the second transmission reflective surface HM2 that is semi-transmission reflective is arranged on the observation surface SP side. Moreover, the image displaying surface ID side of the first lens G1 has the aspherical surface to satisfactorily correct spherical aberration in particular. Further, the image displaying surface ID side of the second lens G2 has the aspherical surface to satisfactorily correct curvature of field in particular.

Here, with the first lens G1 having the triple-pass configuration to adopt a refractive power arrangement with which the curvature of the second transmission reflective surface HM2 is reduced, the reduction in thickness of the observation optical system is achieved.

With the above-mentioned configuration, the observation optical system that is easily configured to have the small thickness while having the wide field of view and the high optical performance is achieved.

Embodiment 2

Figure 3:
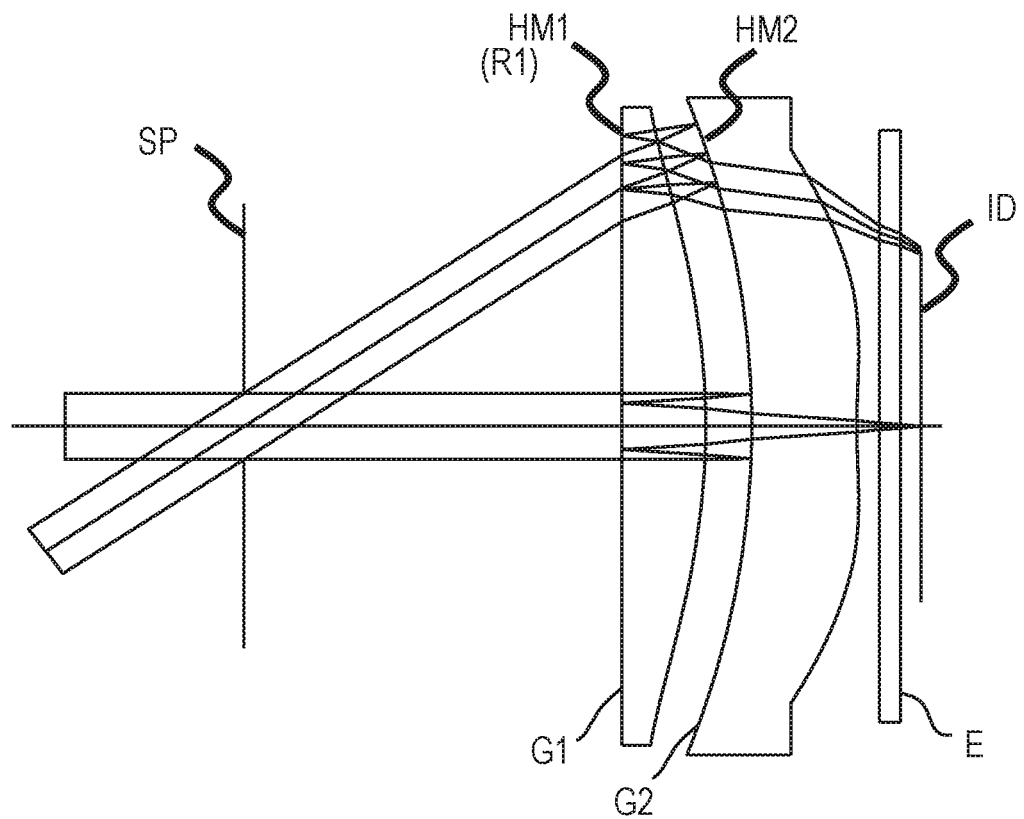
FIG. 3 is a lens cross-sectional view of Embodiment 2 of the present invention.
Figure 4:
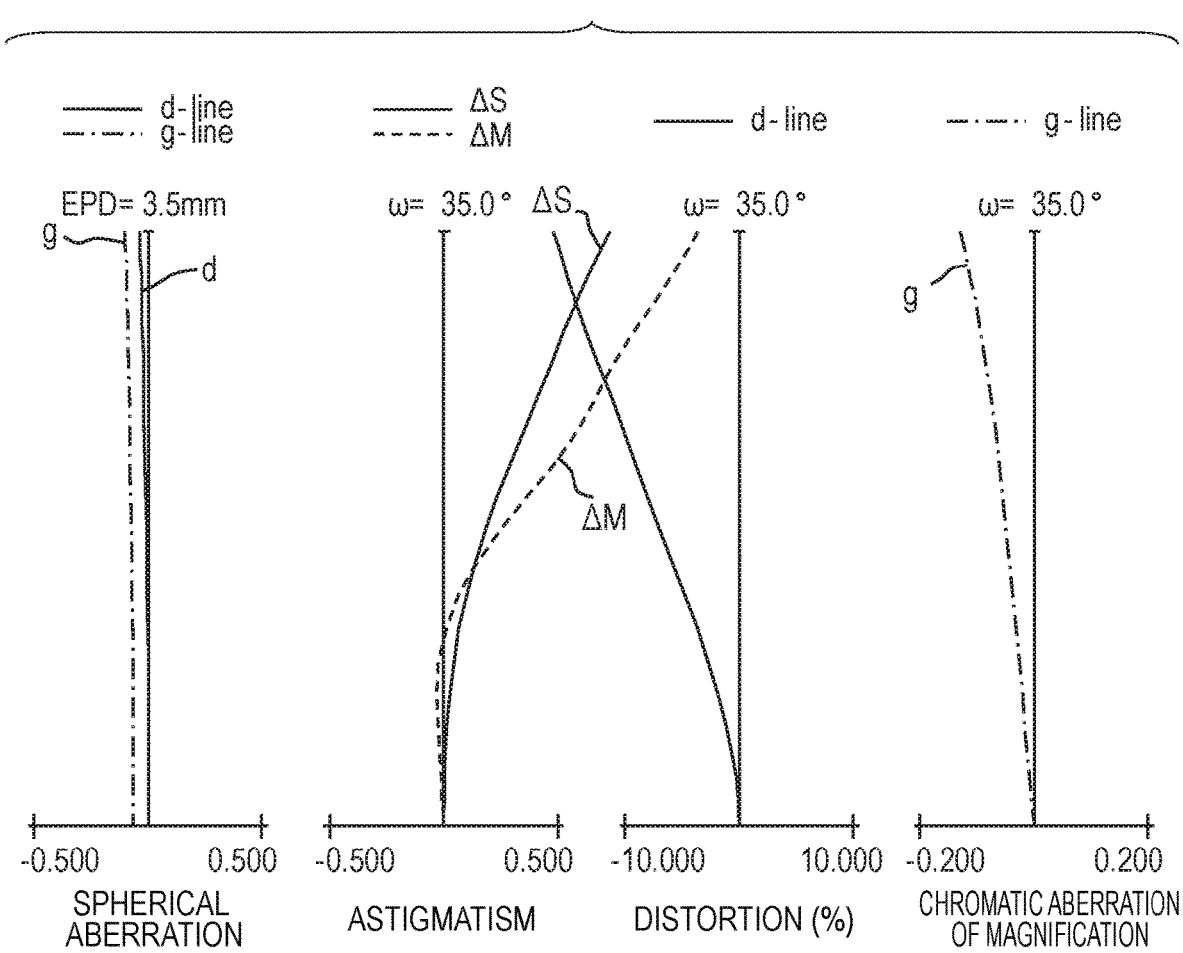
FIG. 4 is a longitudinal aberration diagram (pupil diameter Φ: 3.5 mm, eye relief: 18 mm) of Embodiment 2.

Now referring to FIG. 3, the observation optical system according to Embodiment 2 of the present invention is described. A basic configuration of the observation optical system according to Embodiment 2 is the same as in Embodiment 1. Embodiment 2 is different from Embodiment 1 in that the total angle of view is increased to a wide viewing angle of 70°, and in that shapes of the lenses and surface intervals are changed.

In Embodiment 2, the observation optical system includes, in order from the observation surface SP side: a first lens G1 having a positive refractive power and having a plano-convex shape, in which a first transmission reflective surface HM1 that is semi-transmission reflective is arranged on the observation surface SP side, and a second lens G2 having a negative refractive power and having a biconcave shape, in which a second transmission reflective surface HM2 that is semi-transmission reflective is arranged on the observation surface SP side.

Embodiment 3

Figure 5:
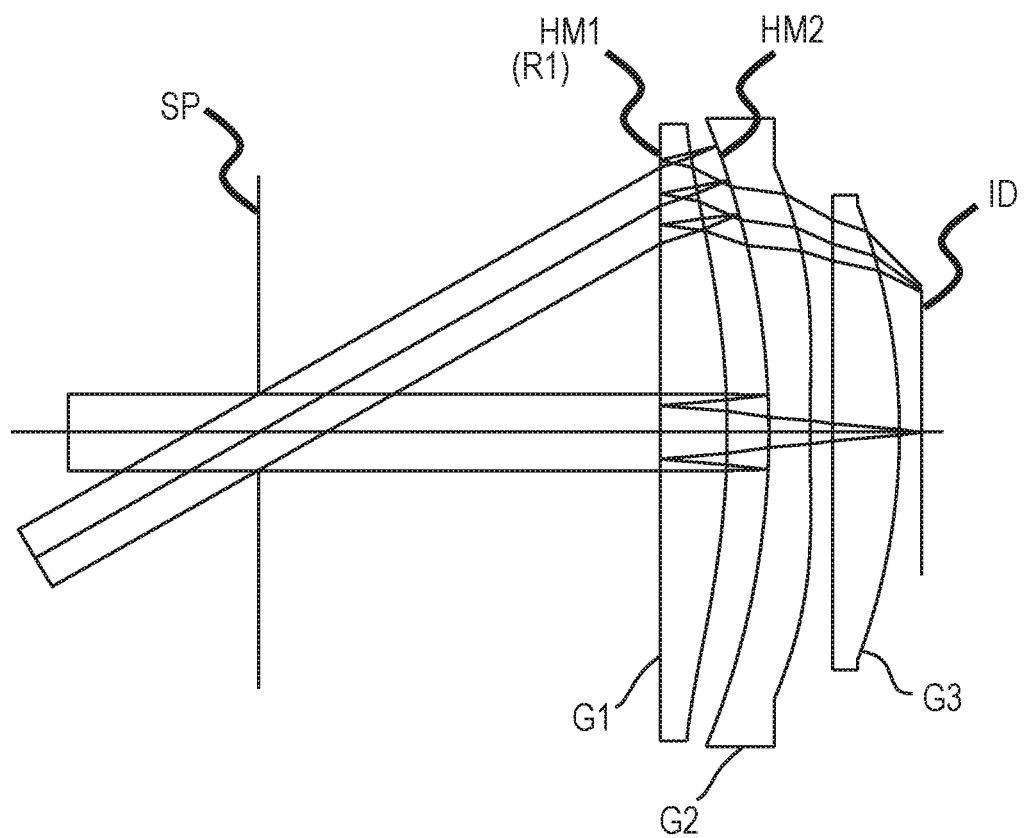
FIG. 5 is a lens cross-sectional view of Embodiment 3 of the present invention.
Figure 6:
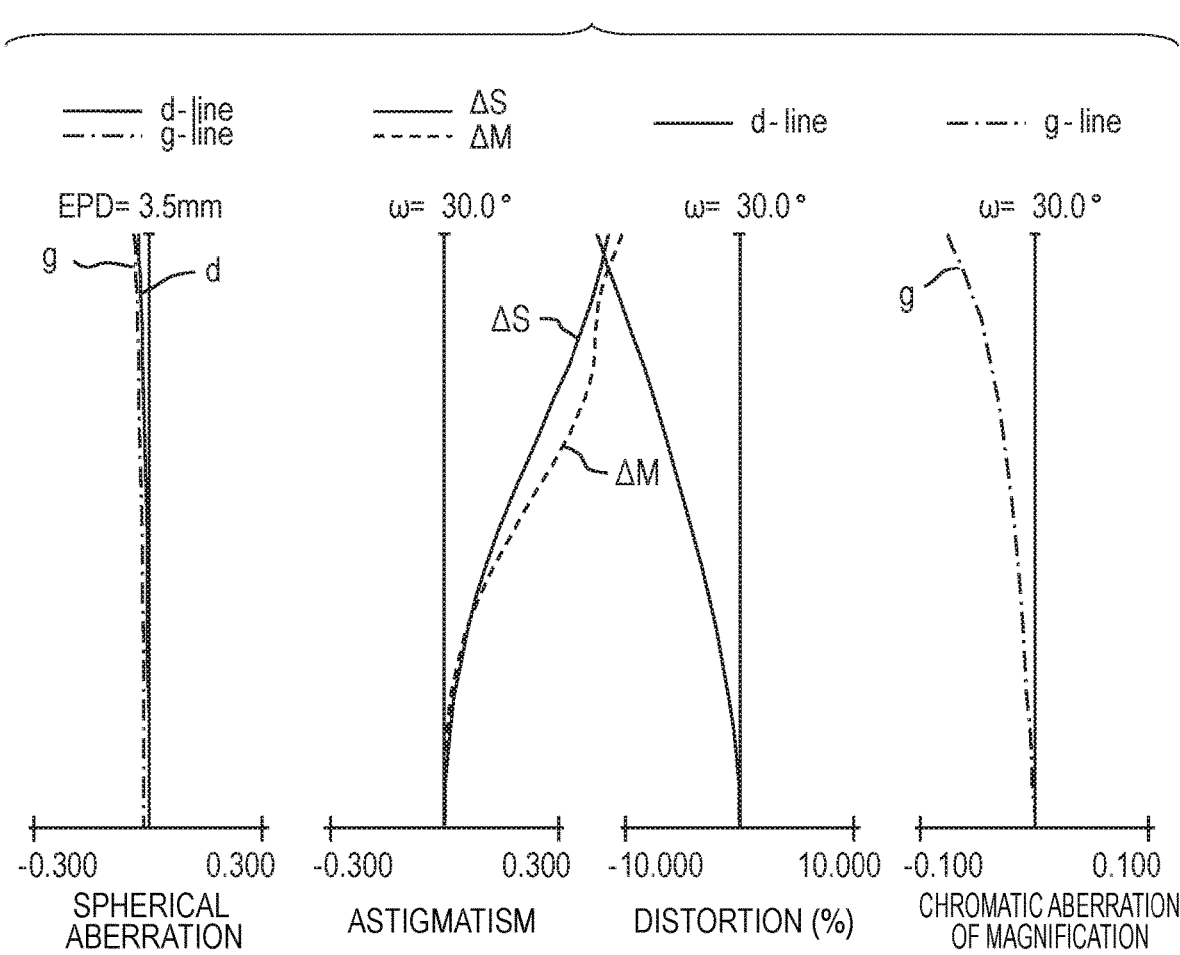
FIG. 6 is a longitudinal aberration diagram (pupil diameter Φ: 3.5 mm, eye relief: 18 mm) of Embodiment 3.

Now referring to FIG. 5, the observation optical system according to Embodiment 3 of the present invention is described.

Embodiment 3 relates to an observation optical system having a total angle of view of 60°.

In Embodiment 3, the observation optical system includes, in order from the observation surface SP side, a first lens G1 having a positive refractive power and having a plano-convex shape, in which the first transmission reflective surface HM1 that is semi-transmission reflective is arranged on the observation surface SP side. The observation optical system further includes: a second lens G2 having a negative refractive power and having a biconcave shape, in which a second transmission reflective surface HM2 that is semi-transmission reflective is arranged on the observation surface SP side; and a third lens G3 having a positive refractive power and having a plano-convex shape. Through sharing the positive refractive power of the entire observation optical system by the third lens G3 to reduce the curvature of the second transmission reflective surface HM2, and arranging the second lens G2 as a lens having the negative refractive power, chromatic aberration is satisfactorily corrected.

Embodiment 4

Figure 7:
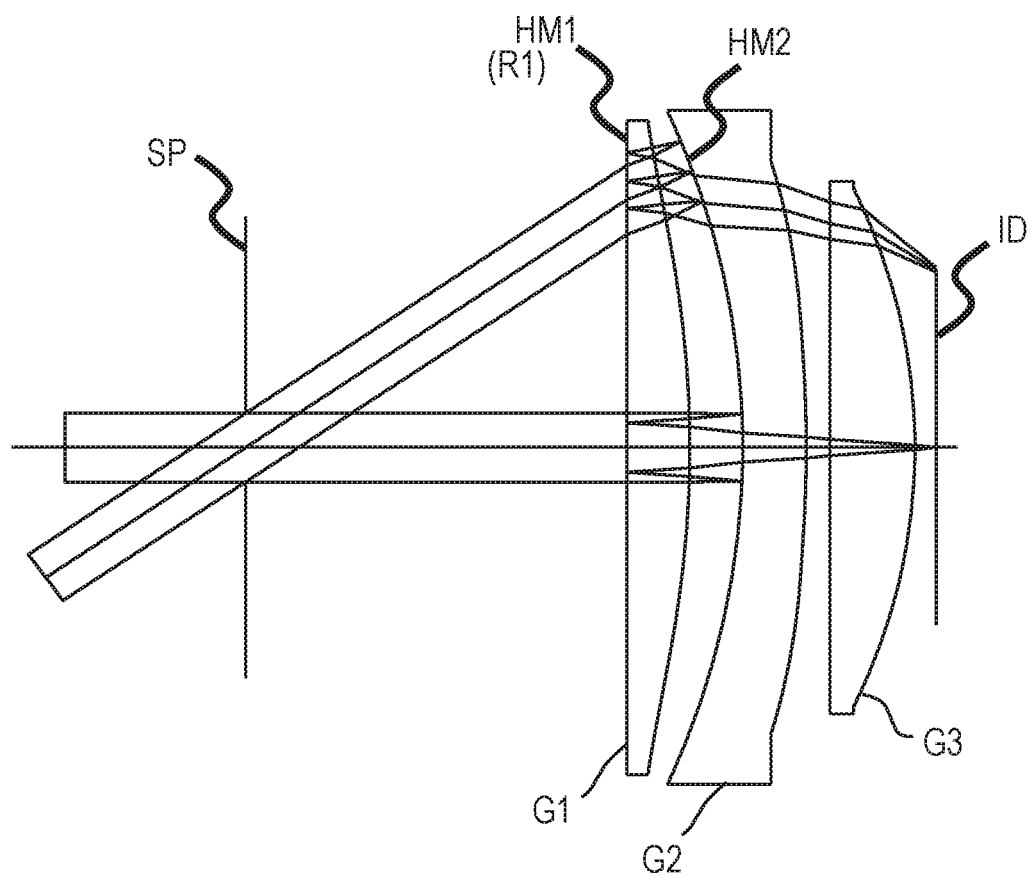
FIG. 7 is a lens cross-sectional view of Embodiment 4 of the present invention.
Figure 8:
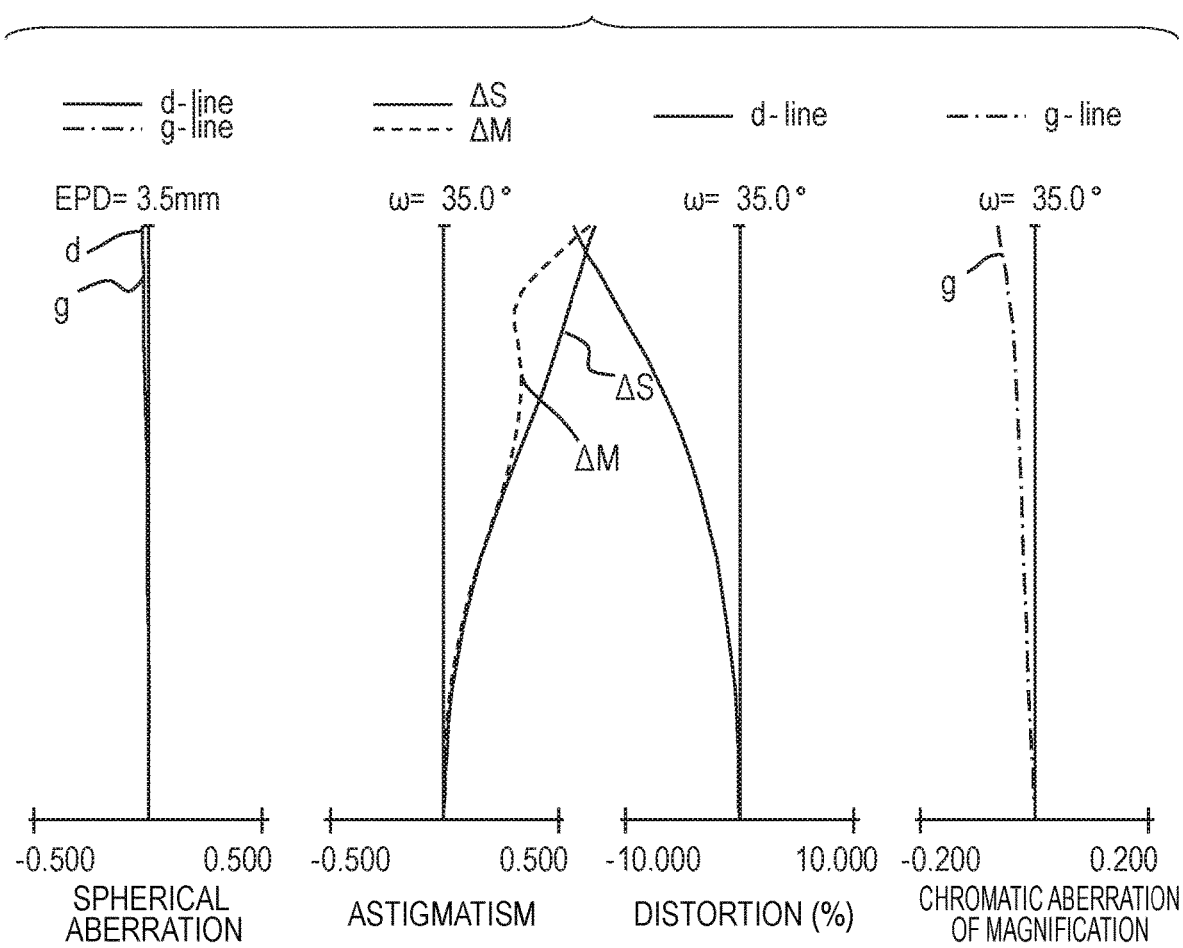
FIG. 8 is a longitudinal aberration diagram (pupil diameter Φ: 3.5 mm, eye relief: 18 mm) of Embodiment 4.

Now referring to FIG. 7, the observation optical system according to Embodiment 4 of the present invention is described. A basic configuration of the observation optical system according to Embodiment 4 is the same as in Embodiment 3. Embodiment 4 is different from Embodiment 3 in that the total angle of view is increased to a wide viewing angle of 70°, and in that shapes of the lenses and surface intervals are changed.

In Embodiment 4, the observation optical system includes, in order from the observation surface SP side, a first lens G1 having a positive refractive power and having a plano-convex shape, in which the first transmission reflective surface HM1 that is semi-transmission reflective is arranged on the observation surface SP side. The observation optical system further includes: a second lens G2 having a negative refractive power and having a meniscus shape that is concave toward the pupil surface side, in which the second transmission reflective surface HM2 that is semi-transmission reflective is arranged on the observation surface SP side; and a third lens G3 having a positive refractive power and having a plano-convex shape.

Embodiment 5

Figure 9:
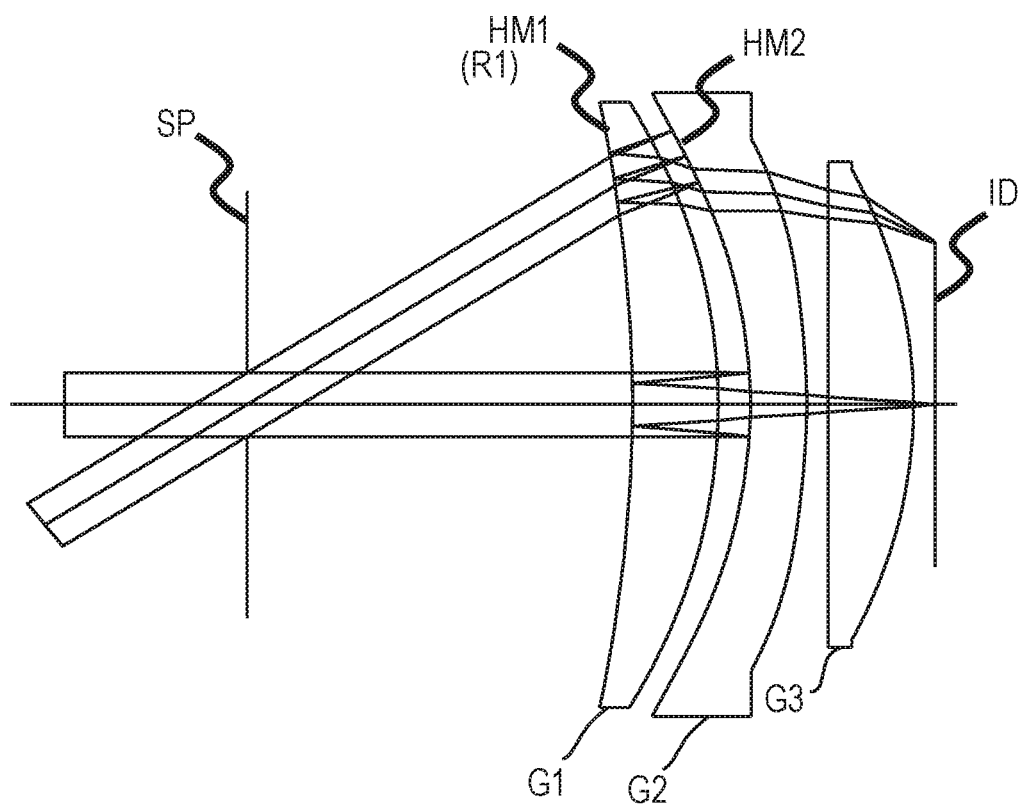
FIG. 9 is a lens cross-sectional view of Embodiment 5 of the present invention.
Figure 10:
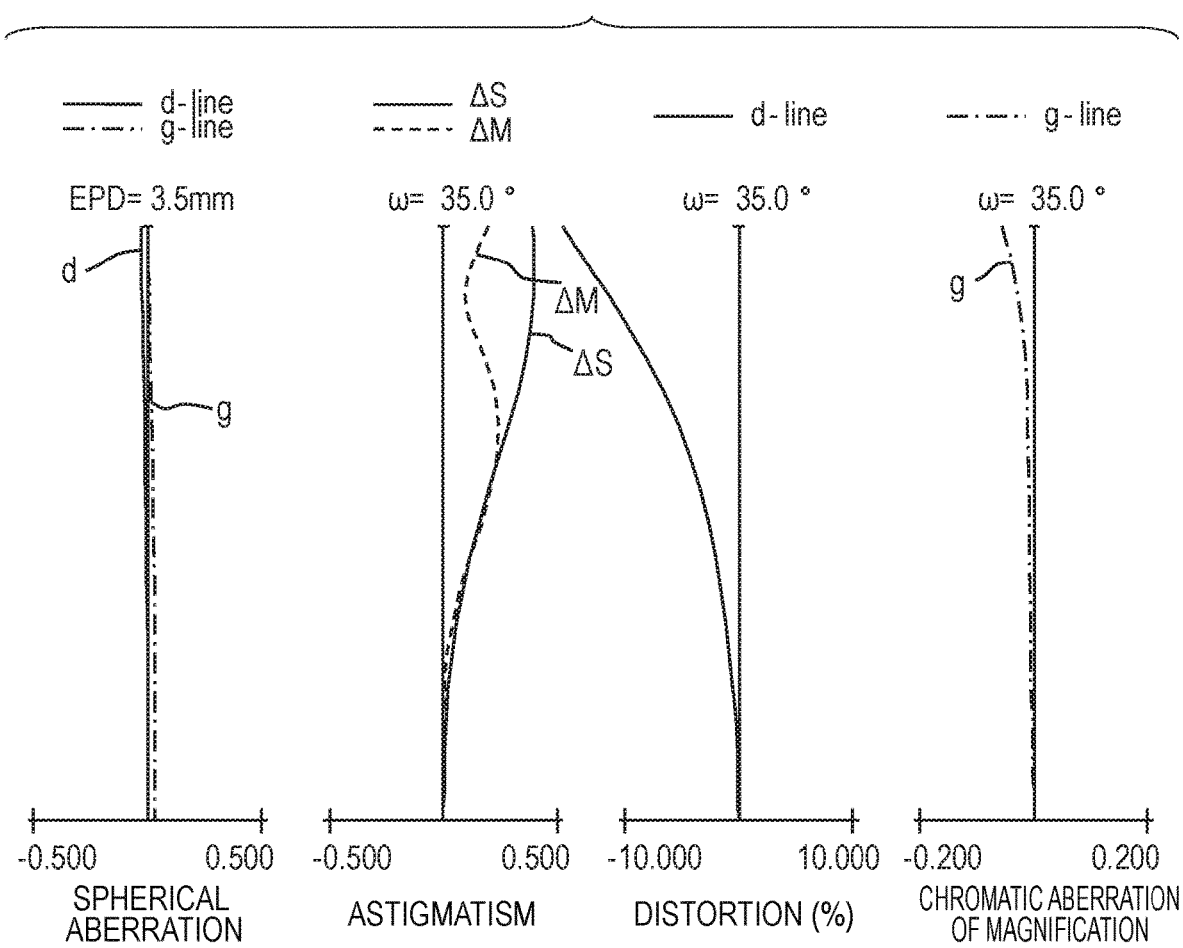
FIG. 10 is a longitudinal aberration diagram (pupil diameter Φ: 3.5 mm, eye relief: 18 mm) of Embodiment 5.

Now referring to FIG. 9, the observation optical system according to Embodiment 5 of the present invention is described.

Embodiment 5 relates to an observation optical system having a total angle of view of 70°.

The observation optical system according to Embodiment 5 includes, in order from the observation surface SP side, a first lens G1 having a positive refractive power and having a meniscus shape that is concave toward the pupil surface side, in which a first transmission reflective surface HM1 that is semi-transmission reflective is arranged on the observation surface SP side. The observation optical system further includes a second lens G2 having a negative refractive power and having a meniscus shape that is concave toward the pupil surface side, in which a second transmission reflective surface HM2 that is semi-transmission reflective is arranged on the observation surface SP side. The observation optical system further includes, on the image displaying surface ID of the second lens G2, a third lens G3 having a positive refractive power and having a plano-convex shape. Here, through adopting the configuration in which the first transmission reflective surface HM1 has the curvature of the concave shape on the observation surface SP side, the first transmission reflective surface HM1 has a negative refractive power when used as a reflective surface. With this configuration, the effect of correcting spherical aberration is obtained, and a large negative Petzval term that occurs when light is reflecting on the second transmission reflective surface HM2 is compensated for, with the result that curvature of field of the entire observation optical system is satisfactorily corrected.

Next, data of Embodiments 1 to 5, Numerical Data 1 to 5, and a reference example of the present invention is presented.

In each set of Numerical Data, the number of a surface on the optical path from the observation surface (stop) is represented by "i". A curvature radius of a lens surface and a reflective surface is represented by "ri". A lens thickness and air interval between the i-th surface and the (i+1)th surface are denoted by "di", and a refractive index and an Abbe number with respect to the d-line are denoted by "ndi" and "vdi", respectively. A diameter of the pupil is represented by EPD. The total lens length is a value obtained adding an air-equivalent back focus BF to a distance from a lens surface (r2) on the observation surface side to a lens surface on the image displaying surface ID side.

For example, in Numerical Data 1, the air-equivalent back focus is 2.16, and hence the lens total length is calculated as follows.

2.64+3.65+4.00+2.16(BF)=12.45

In lens group data, the first group is the stop (r1), and the second group corresponds to the observation optical system.

A symbol "*" indicates an aspherical surface. In addition, aspherical surface coefficients are represented by "k", A4, A6, A8, and A10. As to the aspherical shape, a displacement "x" in the optical axis direction with respect to the surface apex at a position of a height "h" from the optical axis is expressed by the following expression.

$$x = (h^2/R)/[1+\{1-(1+k)(h/R)^2\}^{1/2}] + A4 \times h^4 + A6 \times h^6 + A8 \times h^8 + A10 \times h^{10}$$

In this expression, R is a paraxial curvature radius.

In addition, a relationship between each conditional expression provided above and each set of numerical data is shown in Table 1.

(Numerical Data 1)

| Unit: mm | | | | | |
|---|---|---|---|---|---|
| Surface data | | | | | |
| Surface number | r | d | nd | vd | Effective diameter |
| 1 (Stop) | ∞ | 18.00 | | | 3.50 |
| 2 | ∞ | 2.64 | 1.53110 | 55.9 | 26.00 |
| 3* | −46.149 | 3.65 | | | 26.00 |
| 4 | −47.347 | −3.65 | Reflective surface | | 27.50 |
| 5* | −46.149 | −2.64 | 1.53110 | 55.9 | 26.00 |
| 6 | ∞ | 2.64 | Reflective surface | | 26.00 |
| 7* | −46.149 | 3.65 | | | 26.00 |
| 8 | −47.347 | 4.00 | 1.53110 | 55.9 | 27.50 |
| 9* | −18.057 | 0.50 | | | 27.50 |
| 10 | ∞ | 1.00 | 1.51680 | 64.2 | 25.00 |
| 11 | ∞ | 1.00 | | | 25.00 |
| Image plane | ∞ | | | | |

| Aspherical surface data | | |
|---|---|---|
| Third surface | | |
| K = 0.00000e+000 | A4 = 8.56541e−006 | A6 = 4.20185e−008 |
| A8 = −2.58046e−010 | A10 = 1.05604e−012 | |
| Fifth surface | | |
| K = 0.00000e+000 | A4 = 8.56541e−006 | A6 = 4.20185e−008 |
| A8 = −2.58046e−010 | A10 = 1.05604e−012 | |
| Seventh surface | | |
| K = 0.00000e+000 | A4 = 8.56541e−006 | A6 = 4.20185e−008 |
| A8 = −2.58046e−010 | A10 = 1.05604e−012 | |
| Ninth surface | | |
| K = 0.00000e+000 | A4 = 1.25088e−004 | A6 = −9.66087e−007 |
| A8 = 3.48388e−009 | A10 = −2.46357e−012 | |

| Various data | |
|---|---|
| Focal length | 14.69 |
| EPD (Pupil diameter) | 3.50 |
| Half angle of view (degrees) | 25.00 |
| Total lens length (in Air) | 12.45 |
| BF (in Air) | 2.16 |
| Entrance pupil position | 0.00 |
| Exit pupil position | 16.35 |
| Front principal point position | 28.76 |
| Rear principal point position | −13.69 |

| Lens unit data | | | | | |
|---|---|---|---|---|---|
| Unit | First surface | Focal length | Lens unit structure length | Front principal point position | Rear principal point position |
| 1 | 1 | ∞ | 0.00 | 0.00 | −0.00 |
| 2 | 2 | 14.69 | 11.79 | 10.76 | −13.69 |

| Single lens data | | |
|---|---|---|
| Lens | First surface | Focal length |
| G1 | 1 | 86.89 |
| G2 | 8 | 52.47 |

(Numerical Data 2)

| Unit: mm | | | | | |
|---|---|---|---|---|---|
| Surface data | | | | | |
| Surface number | r | d | nd | vd | Effective diameter |
| 1 (Stop) | ∞ | 18.00 | | | 3.50 |
| 2 | ∞ | 4.00 | 1.53110 | 55.9 | 32.50 |
| 3* | −41.601 | 2.18 | | | 32.50 |
| 4 | −50.434 | −2.18 | Reflective surface | | 33.50 |
| 5* | −41.601 | −4.00 | 1.53110 | 55.9 | 32.50 |
| 6 | ∞ | 4.00 | Reflective surface | | 32.50 |
| 7* | −41.601 | 2.18 | | | 32.50 |
| 8 | −50.434 | 5.00 | 1.53110 | 55.9 | 33.50 |
| 9* | 46.037 | 1.06 | | | 28.00 |
| 10 | ∞ | 1.00 | 1.51680 | 64.2 | 30.00 |
| 11 | ∞ | 1.00 | | | 30.00 |
| Image plane | ∞ | | | | |

| Aspherical surface data | | |
|---|---|---|
| Third surface | | |
| K = 0.00000e+000 | A4 = 1.94709e−006 | A6 = 7.31640e−008 |
| A8 = −2.64352e−010 | A10 = 4.43224e−013 | |
| Fifth surface | | |
| K = 0.00000e+000 | A4 = 1.94709e−006 | A6 = 7.31640e−008 |
| A8 = −2.64352e−010 | A10 = 4.43224e−013 | |
| Seventh surface | | |
| K = 0.00000e+000 | A4 = 1.94709e−006 | A6 = 7.31640e−008 |
| A8 = −2.64352e−010 | A10 = 4.43224e−013 | |

-continued

Unit: mm

Ninth surface

K = 0.00000e+000   A4 = −3.95815e−004   A6 = 2.77171e−006
A8 = −9.95674e−009  A10 = 1.41139e−011

Various data

| | |
|---|---|
| Focal length | 15.85 |
| EPD (Pupil diameter) | 3.50 |
| Half angle of view (degrees) | 35.00 |
| Total lens length (in Air) | 13.90 |
| BF (in Air) | 2.72 |
| Entrance pupil position | 0.00 |
| Exit pupil position | 55.39 |
| Front principal point position | 20.46 |
| Rear principal point position | −14.85 |

Lens unit data

| Unit | First surface | Focal length | Lens unit structure length | Front principal point position | Rear principal point position |
|---|---|---|---|---|---|
| 1 | 1 | ∞ | 0.00 | 0.00 | −0.00 |
| 2 | 2 | 15.85 | 13.24 | 2.46 | −14.85 |

Single lens data

| Lens | First surface | Focal length |
|---|---|---|
| G1 | 1 | 78.33 |
| G2 | 8 | −44.52 |

(Numerical Data 3)

Unit: mm

Surface data

| Surface number | r | d | nd | vd | Effective diameter |
|---|---|---|---|---|---|
| 1 (Stop) | ∞ | 18.00 | | | 3.50 |
| 2 | ∞ | 3.00 | 1.53110 | 55.9 | 27.00 |
| 3* | −38.483 | 1.87 | | | 27.00 |
| 4 | −38.005 | −1.87 | Reflective surface | | 27.50 |
| 5* | −38.483 | −3.00 | 1.53110 | 55.9 | 27.00 |
| 6 | ∞ | 3.00 | Reflective surface | | 27.00 |
| 7* | −38.483 | 1.87 | | | 27.00 |
| 8 | −38.005 | 1.83 | 1.63550 | 23.9 | 27.50 |
| 9* | 99.896 | 1.00 | | | 23.30 |
| 10 | ∞ | 3.00 | 1.48749 | 70.2 | 20.60 |
| 11 | −30.050 | 1.00 | | | 19.60 |
| Image plane | ∞ | | | | |

Aspherical surface data

Third surface

K = 0.00000e+000   A4 = 1.14783e−005   A6 = 8.12048e−008
A8 = −3.42503e−010  A10 = 1.00372e−012

Fifth surface

K = 0.00000e+000   A4 = 1.14783e−005   A6 = 8.12048e−008
A8 = −3.42503e−010  A10 = 1.00372e−012

Seventh surface

K = 0.00000e+000   A4 = 1.14783e−005   A6 = 8.12048e−008
A8 = −3.42503e−010  A10 = 1.00372e−012

-continued

Unit: mm

Ninth surface

K = 0.00000e+000   A4 = −2.17485e−004   A6 = 1.14074e−006
A8 = −3.03928e−009  A10 = 2.89322e−012

Various data

| | |
|---|---|
| Focal length | 12.96 |
| EPD (Pupil diameter) | 3.50 |
| Half angle of view (degrees) | 30.00 |
| Total lens length (in Air) | 11.70 |
| BF (in Air) | 1.00 |
| Entrance pupil position | 0.00 |
| Exit pupil position | 17.56 |
| Front principal point position | 23.10 |
| Rear principal point position | −11.96 |

Lens unit data

| Unit | First surface | Focal length | Lens unit structure length | Front principal point position | Rear principal point position |
|---|---|---|---|---|---|
| 1 | 1 | ∞ | 0.00 | 0.00 | −0.00 |
| 2 | 2 | 12.96 | 10.70 | 5.10 | −11.96 |

Single lens data

| Lens | First surface | Focal length |
|---|---|---|
| G1 | 1 | 72.46 |
| G2 | 8 | −43.10 |
| G3 | 10 | 61.64 |

(Numerical Data 4)

Unit: mm

Surface data

| Surface number | r | d | nd | vd | Effective diameter |
|---|---|---|---|---|---|
| 1 (Stop) | ∞ | 18.00 | | | 3.50 |
| 2 | ∞ | 3.00 | 1.53110 | 55.9 | 32.00 |
| 3* | −56.776 | 2.50 | | | 32.00 |
| 4 | −43.078 | −2.50 | Reflective surface | | 33.00 |
| 5* | −56.776 | −3.00 | 1.53110 | 55.9 | 32.00 |
| 6 | ∞ | 3.00 | Reflective surface | | 32.00 |
| 7* | −56.776 | 2.50 | | | 32.00 |
| 8 | −43.078 | 3.00 | 1.63550 | 23.9 | 33.00 |
| 9* | −62.352 | 1.13 | | | 27.90 |
| 10 | ∞ | 4.00 | 1.51633 | 64.1 | 25.80 |
| 11 | −31.372 | 1.00 | | | 25.20 |
| Image plane | ∞ | | | | |

Aspherical surface data

Third surface

K = 0.00000e+000   A4 = 6.85461e−007   A6 = 3.53596e−008
A8 = −1.07426e−010  A10 = 2.19948e−013

Fifth surface

K = 0.00000e+000   A4 = 6.85461e−007   A6 = 3.53596e−008
A8 = −1.07426e−010  A10 = 2.19948e−013

Seventh surface

K = 0.00000e+000   A4 = 6.85461e−007   A6 = 3.53596e−008
A8 = −1.07426e−010  A10 = 2.19948e−013

-continued

Unit: mm

Ninth surface

K = 0.00000e+000  A4 = 7.54434e−005  A6 = −9.46153e−007
A8 = 4.33138e−009  A10 = −7.15247e−012

Various data

| | |
|---|---|
| Focal length | 15.12 |
| EPD (Pupil diameter) | 3.50 |
| Half angle of view (degrees) | 35.00 |
| Total lens length (in Air) | 14.63 |
| BF (in Air) | 1.00 |
| Entrance pupil position | 0.00 |
| Exit pupil position | 20.75 |
| Front principal point position | 26.71 |
| Rear principal point position | −14.12 |

Lens unit data

| Unit | First surface | Focal length | Lens unit structure length | Front principal point position | Rear principal point position |
|---|---|---|---|---|---|
| 1 | 1 | ∞ | 0.00 | 0.00 | −0.00 |
| 2 | 2 | 15.12 | 13.63 | 8.71 | −14.12 |

Single lens data

| Lens | First surface | Focal length |
|---|---|---|
| G1 | 1 | 106.90 |
| G2 | 8 | −233.40 |
| G3 | 10 | 60.76 |

(Numerical Data 5)

Unit: mm

Surface data

| Surface number | r | d | nd | vd | Effective diameter |
|---|---|---|---|---|---|
| 1 (Stop) | ∞ | 18.00 | | | 3.50 |
| 2 | −90.909 | 4.00 | 1.48749 | 70.2 | 32.00 |
| 3 | −35.422 | 1.50 | | | 32.00 |
| 4* | −31.957 | −1.50 | Reflective surface | | 33.00 |
| 5 | −35.422 | −4.00 | 1.48749 | 70.2 | 32.00 |
| 6 | −90.909 | 4.00 | Reflective surface | | 32.00 |
| 7 | −35.422 | 1.50 | | | 32.00 |
| 8* | −31.957 | 2.62 | 1.63550 | 23.9 | 33.00 |
| 9* | −41.393 | 1.00 | | | 28.00 |
| 10 | ∞ | 4.00 | 1.51633 | 64.1 | 25.40 |
| 11 | −30.563 | 1.00 | | | 24.80 |
| Image plane | ∞ | | | | |

Aspherical surface data

Fourth surface

K = 0.00000e+000  A4 = −1.25436e−006  A6 = 2.13936e−008
A8 = −7.97923e−011  A10 = 2.57813e−013

Eighth surface

K = 0.00000e+000  A4 = −1.25436e−006  A6 = 2.13936e−008
A8 = −7.97923e−011  A10 = 2.57813e−013

Ninth surface

K = 0.00000e+000  A4 = 8.53555e−005  A6 = −9.90936e−007
A8 = 4.17264e−009  A10 = −6.36954e−012

Various data

| | |
|---|---|
| Focal length | 15.06 |
| EPD (Pupil diameter) | 3.50 |
| Half angle of view (degrees) | 35.00 |
| Total lens length (in Air) | 14.12 |
| BF (in Air) | 1.00 |
| Entrance pupil position | 0.00 |
| Exit pupil position | 22.95 |
| Front principal point position | 25.38 |
| Rear principal point position | −14.06 |

Lens unit data

| Unit | First surface | Focal length | Lens unit structure length | Front principal point position | Rear principal point position |
|---|---|---|---|---|---|
| 1 | 1 | ∞ | 0.00 | 0.00 | −0.00 |
| 2 | 2 | 15.06 | 13.12 | 7.38 | −14.06 |

Single lens data

| Lens | First surface | Focal length |
|---|---|---|
| G1 | 1 | 116.30 |
| G2 | 8 | −247.29 |
| G3 | 10 | 59.19 |

TABLE 1

| Conditional Expression | Lower limit | Upper limit | Embodiment 1 | 2 | 3 | 4 | 5 |
|---|---|---|---|---|---|---|---|
| (1) | −5.0 | −1.0 | −3.222 | −3.183 | −2.933 | −2.848 | −2.122 |
| (2) | 2.0 | 10.0 | 5.914 | 4.943 | 5.591 | 7.068 | 7.725 |
| (3) | 0.1 | 5.0 | 1.000 | 1.000 | 1.000 | 1.000 | 2.277 |
| (4) | 0.1 | 3.0 | 0.660 | 0.800 | 1.643 | 1.000 | 1.527 |
| (5) | 0.001 | 0.2 | 0.0259 | 0.0483 | 0.0534 | 0.0276 | — |
| (6) | 0.1 | 0.5 | 0.212 | 0.288 | 0.256 | 0.205 | 0.283 |
| (7) | 0.4 | 2.0 | 0.847 | 0.877 | 0.903 | 0.967 | 0.938 |

TABLE 1-continued

| Conditional Expression | Lower limit | Upper limit | Embodiment 1 | 2 | 3 | 4 | 5 |
|---|---|---|---|---|---|---|---|
| RHM2 | — | — | −47.3467 | −50.4336 | −38.0049 | −43.0777 | −31.9508 |
| RG1a | — | — | ∞ | ∞ | ∞ | ∞ | −90.9089 |
| RG1b | — | — | −46.2115 | −41.6201 | −38.5463 | −56.7887 | −35.4224 |
| sagR1b | — | — | 0.3799 | 0.7650 | 0.6925 | 0.4181 | 0.0000 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-155318, filed Aug. 22, 2018, which is hereby incorporated by reference herein in its entirety.

What is claimed is:

1. An observation optical system for use in observing an image displayed on an image displaying surface, the observation optical system comprising, in order from an observation surface side to an image displaying surface side:
   a first lens having a first transmission reflective surface and a first transmissive surface; and
   a second lens having a second transmission reflective surface and a second transmissive surface,
   wherein the first lens and the second lens are arranged via an interval interposed therebetween,
   wherein light from the image displaying surface transmits through the second lens, is reflected by the first transmission reflective surface, is reflected by the second transmission reflective surface, is transmitted through the first lens, and then travels toward the observation surface side,
   wherein a surface on the image displaying surface side of the first lens is an aspherical surface, and
   wherein the following conditional expressions are satisfied:

$2.0 < fG1/f < 10.0$, $0.001 < sagG1b/f < 0.200$, where fG1 is a focal length of the first lens, f is a focal length of the observation optical system, and sagG1b is a difference between a sag amount of a reference spherical surface and a sag amount of the aspherical surface at a maximum effective diameter end of the aspherical surface.

2. The observation optical system according to claim 1, wherein the following conditional expression is satisfied:

$-5.0 < RHM2/f < -1.0$, where RHM2 is a curvature radius of the second transmission reflective surface.

3. The observation optical system according to claim 1, wherein the following conditional expression is satisfied:

$2.0 < fG1/f < 9.0$,

4. The observation optical system according to claim 1, wherein the following conditional expression is satisfied:

$1.0 \leq (RG1a+RG1b)/(RG1a-RG1b) < 5.0$, where RG1a is a curvature radius of a surface on the observation surface side of the first lens, and RG1b is a curvature radius of a surface on the image displaying surface side of the first lens.

5. The observation optical system according to claim 1, wherein the following conditional expression is satisfied:

$0.1 < DG1/DG2 < 3.0$, where DG1 is a center thickness of the first lens, and DG2 is a center thickness of the second lens.

6. The observation optical system according to claim 1, wherein the first transmission reflective surface is a flat surface.

7. The observation optical system according to claim 1, further comprising a third lens having a positive refractive power, which is arranged on the image displaying surface side of the second lens.

8. An observation apparatus comprising:
   the observation optical system of claim 1; and
   an image displaying element having the image displaying surface.

9. The observation apparatus according to claim 8, wherein the following conditional expression is satisfied:

$0.1 < DG1/OAL < 0.5$, where OAL is a distance from the first transmission reflective surface to the image displaying surface, and DG1 is a center thickness of the first lens.

10. The observation apparatus according to claim 8, wherein the following conditional expression is satisfied:

$0.4 < OAL/f < 2.0$, where OAL is a distance from the first transmission reflective surface to the image displaying surface.

11. An observation optical system for use in observing an image displayed on an image displaying surface, the observation optical system comprising, in order from an observation surface side to an image displaying surface side:
    a first lens having a first transmission reflective surface and a first transmissive surface; and
    a second lens having a second transmission reflective surface and a second transmissive surface,
    wherein the first lens and the second lens are arranged via an interval interposed therebetween,
    wherein light from the image displaying surface transmits through the second lens, is reflected by the first transmission reflective surface, is reflected by the second transmission reflective surface, is transmitted through the first lens, and then travels toward the observation surface side,
    wherein the following conditional expressions are satisfied:

$2.0 < fG1/f < 10.0$, and $0.1 < (RG1a+RG1b)/(RG1a-RG1b) < 5.0$, where fG1 is a focal length of the first lens, f is a focal length of the observation optical system, RG1a is a curvature radius of a surface on the observation surface side of the first lens, and RG1b is a curvature radius of a surface on the image displaying surface side of the first lens.

12. The observation optical system according to claim 11, wherein the following conditional expression is satisfied:

$$-5.0 < RHM2/f < -1.0,$$

where RHM2 is a curvature radius of the second transmission reflective surface.

13. The observation optical system according to claim 11, wherein the following conditional expression is satisfied:

$$2.0 < fG1/f < 9.0.$$

14. The observation optical system according to claim 11, wherein the following conditional expression is satisfied:

$$0.1 < DG1/DG2 < 3.0,$$

where DG1 is a center thickness of the first lens, and DG2 is a center thickness of the second lens.

15. The observation optical system according to claim 11, wherein the first transmission reflective surface is a flat surface.

16. The observation optical system according to claim 11, further comprising a third lens having a positive refractive power, which is arranged on the image displaying surface side of the second lens.

17. An observation apparatus comprising:
  the observation optical system of claim 11; and
  an image displaying element having the image displaying surface.

18. The observation apparatus according to claim 17, wherein the following conditional expression is satisfied:

$$0.1 < DG1/OAL < 0.5,$$

where OAL is a distance from the first transmission reflective surface to the image displaying surface, and DG1 is a center thickness of the first lens.

19. The observation apparatus according to claim 17, wherein the following conditional expression is satisfied:

$$0.4 < OAL/f < 2.0,$$

where OAL is a distance from the first transmission reflective surface to the image displaying surface.

* * * * *